US009454165B2

(12) United States Patent
Utsuno

(10) Patent No.: US 9,454,165 B2
(45) Date of Patent: Sep. 27, 2016

(54) SEMICONDUCTOR DEVICE AND CURRENT CONTROL METHOD THAT CONTROLS AMOUNT OF CURRENT USED FOR VOLTAGE GENERATION BASED ON CONNECTION STATE OF EXTERNAL CAPACITOR

(71) Applicant: LAPIS SEMICONDUCTOR CO., LTD., Yokohama-shi, Kanagawa (JP)

(72) Inventor: Kikuo Utsuno, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 0 days.

(21) Appl. No.: 14/471,685

(22) Filed: Aug. 28, 2014

(65) Prior Publication Data

US 2015/0061631 A1 Mar. 5, 2015

(30) Foreign Application Priority Data

Sep. 3, 2013 (JP) ................................. 2013-182503

(51) Int. Cl.

*H02M 1/08* (2006.01)
*G05F 1/563* (2006.01)
*G05F 3/30* (2006.01)
*G05F 3/24* (2006.01)

(52) U.S. Cl.

CPC ............... *G05F 1/563* (2013.01); *G05F 3/242* (2013.01); *G05F 3/30* (2013.01)

(58) Field of Classification Search

CPC ........ G05F 1/462; G05F 1/565; G05F 1/575; G05F 3/02; G05F 3/16
USPC .......... 323/273, 275, 311-317, 349; 327/541
See application file for complete search history.

(56) References Cited

U.S. PATENT DOCUMENTS 5,686,823 A * 11/1997 Rapp ........................ G05F 3/267 323/313
6,188,211 B1 * 2/2001 Rincon-Mora et al. ...... 323/280
2002/0024315 A1 * 2/2002 Kubozuka et al. ........... 318/685
2004/0239414 A1 * 12/2004 Otake ...................... G05F 3/242 327/541
2008/0036639 A1 * 2/2008 Wakamatsu .................. 341/155
2011/0074445 A1 * 3/2011 Nascimento .................. 324/676
2014/0029308 A1 * 1/2014 Cojocaru et al. ............... 363/13

FOREIGN PATENT DOCUMENTS

JP 2007228357 A 9/2007
JP 2008017566 A 1/2008

* cited by examiner

*Primary Examiner* — Jessica Han
*Assistant Examiner* — Demetries A Gibson
(74) *Attorney, Agent, or Firm* — Volentine & Whitt, PLLC

(57) ABSTRACT

There is provided a semiconductor device including: a current generation circuit that generates a current; a voltage generation circuit that, using the current generated by the current generation circuit, generates and outputs a predetermined voltage from a reference voltage, with an internal capacitor element that is connected to output of the voltage generation circuit, the internal capacitor element being provided within an integrated circuit on which the device itself is mounted; a storage section that stores a flag indicating a connection state between the output of the voltage generation circuit and an external capacitor element provided externally to the integrated circuit; and a controller that, based on the flag, controls a current amount of the current used by the voltage generation circuit to generate the predetermined voltage.

8 Claims, 10 Drawing Sheets

CONSTANT VOLTAGE DEVICE 10

FIG.6
START
STOP
SEN
VR2
VR
VDDL POTENTIAL
CMP
SEL

SEMICONDUCTOR DEVICE AND CURRENT CONTROL METHOD THAT CONTROLS AMOUNT OF CURRENT USED FOR VOLTAGE GENERATION BASED ON CONNECTION STATE OF EXTERNAL CAPACITOR

CROSS-REFERENCE TO RELATED APPLICATION

This application claims priority under 35 USC 119 from Japanese Patent application No. 2013-182503 filed on Sep. 3, 2013, the disclosure of which is incorporated by reference herein.

BACKGROUND

1. Technical Field

The present invention relates to a semiconductor device and a current amount control method.

2. Related Art

In processing circuits, such as logic circuits, that are mounted to semiconductor chips (semiconductor integrated circuits), direct application of a semiconductor chip power source voltage is sometimes not possible due to a decrease in tolerable voltage accompanying miniaturization of the transistors employed. In such cases, a constant voltage device is mounted to the semiconductor chip, and a predetermined voltage is generated using the constant voltage device and supplied to the logic circuit. As an example of such a constant voltage device, Japanese Patent Application Laid-Open (JP-A) No. 2008-17566 describes a power generation circuit with an output connected to an externally attached capacitor element that acts as a decoupling capacitor.

Recently, due to demands for cost reduction and miniaturization of mounted boards, there is a call for decoupling capacitors to be internally provided to semiconductor chips, rather than externally connected. Decoupling capacitors generally have a smaller capacity when internally provided than when externally connected. Constant voltage devices are accordingly heavily affected by a voltage drop with respect to the potential of an original output voltage, that occurs due to the load current from driving the logic circuit.

To solve this issue, the response time of a constant voltage device is shortened by increasing the constant voltage device drive current when capacitor elements are internally provided, compared to when capacitor elements are externally connected. An example of a method enabling current amount to be varied is described in, for example, JP-A No. 2007-228357, in which the current amount of a current generated by a current mirror circuit can be varied.

When capacitor elements are internally provided to semiconductor chips, there is an issue of increased current consumption due to the increase in the current amount of the constant voltage device, as described above. As a result, externally connected capacitor elements are employed when current consumption takes precedence over mounted board miniaturization (when current consumption is suppressed).

Constant voltage devices that are compatible whether or not externally connected capacitor elements are present are therefore desirable, since whether or not externally connected capacitor elements are employed is determined by, for example, user preference. However, in the technology of JP-A No. 2008-17566 and JP-A No. 2007-228357, the current amount of the constant voltage device drive current does not change according to whether or not externally connected capacitor elements are present.

SUMMARY

In consideration of the above circumstances, an object of the present invention is to provide a semiconductor device and a current amount control method that are capable of regulating the current amount of a current used by a voltage generation circuit to generate a predetermined voltage, according to a connection state of an external capacitor element.

A first aspect of the present invention is a semiconductor device including a current generation circuit that generates a current, a voltage generation circuit that, using the current generated by the current generation circuit, generates and outputs a predetermined voltage from a reference voltage, with an internal capacitor element that is connected to output of the voltage generation circuit, the internal capacitor element being provided within an integrated circuit on which the device itself is mounted, a storage section that stores a flag indicating a connection state between the output of the voltage generation circuit and an external capacitor element provided externally to the integrated circuit, and a controller that, based on the flag, controls a current amount of the current used by the voltage generation circuit to generate the predetermined voltage.

The second aspect of the present invention is a semiconductor device including a current generation circuit that generates current, a voltage generation circuit that, using the current generated by the current generation circuit, generates and outputs a predetermined voltage from a reference voltage, with an internal capacitor element that is connected to output of the voltage generation circuit, the internal capacitor element being provided within an integrated circuit on which the device itself is mounted, and a controller that determines a connection state between the output of the voltage generation circuit and an external capacitor element provided externally to the integrated circuit, and that controls the current amount of the current used by the voltage generation circuit to generate the predetermined voltage, based on the connection state.

The third aspect of the present invention is a current control method including: a process of using a current generation circuit to generate a current, a process of using a voltage generation circuit having an internal capacitor element that is connected to an output of the voltage generation circuit, the internal capacitor element being provided within an integrated circuit on which the device itself is mounted, to generate, and output, a predetermined voltage from a reference voltage using the current generated by the current generation circuit, and a process of using a controller to, based on a flag stored in a storage section indicating a connection state between the output of the voltage generation circuit and an external capacitor element provided externally to the integrated circuit, to control a current amount of the current used by the voltage generation circuit to generate the predetermined voltage.

The present invention exhibits the advantageous effect of enabling the current amount of the current, used by the voltage generation circuit to generate the predetermined voltage, to be regulated according to the connection state of the external capacitor element.

BRIEF DESCRIPTION OF THE DRAWINGS

Exemplary embodiments of the present invention will be described in detail based on the following figures, wherein.

DETAILED DESCRIPTION

Explanation follows regarding an example of an exemplary embodiment, with reference to the respective drawings.

First Exemplary Embodiment

Figure 1:
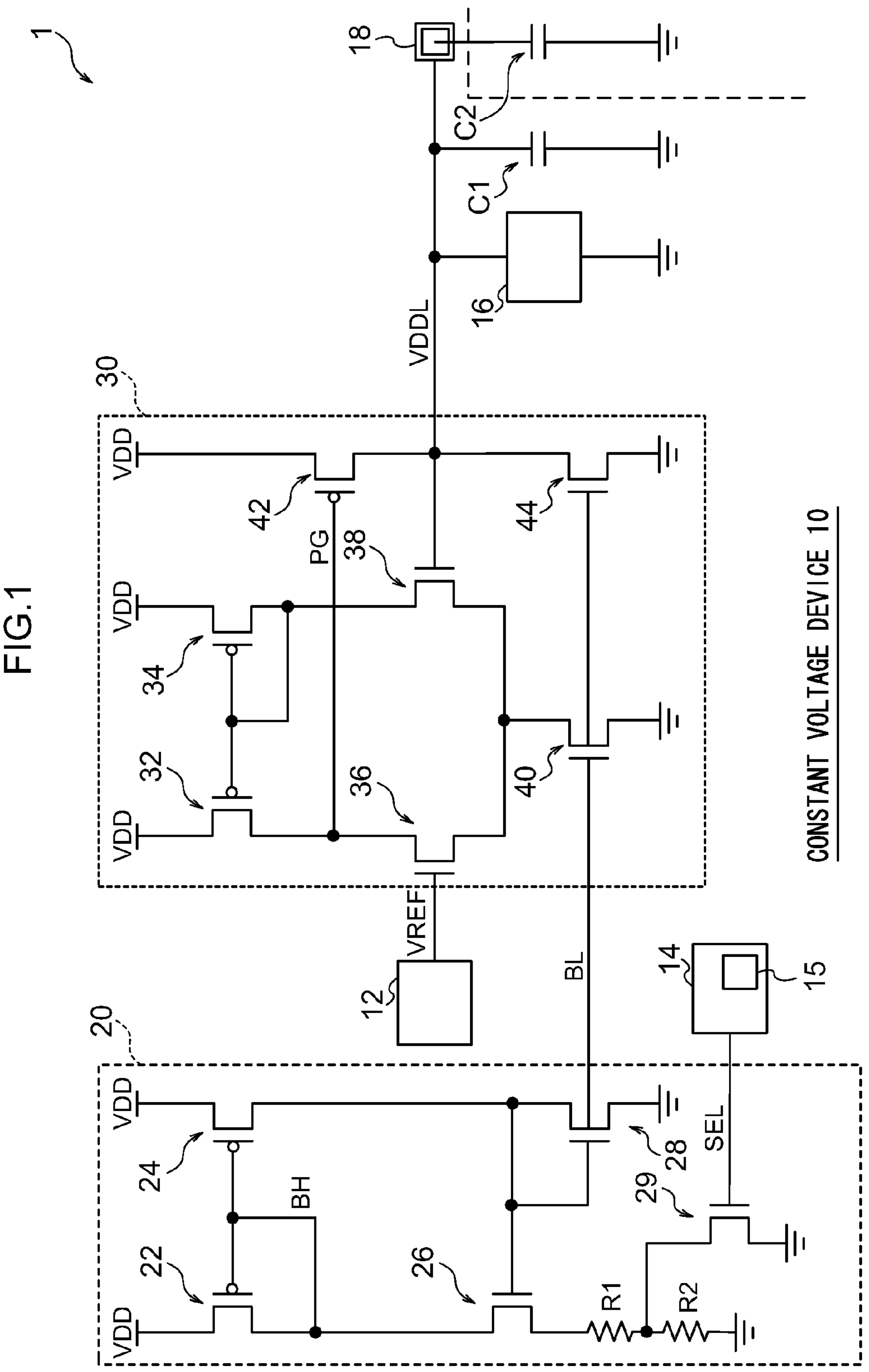
FIG. 1 is a circuit diagram illustrating an example of configuration of a constant voltage device of a first exemplary embodiment.

First, explanation is given regarding configuration of a constant voltage device serving as a semiconductor device of the present exemplary embodiment. FIG. 1 is a circuit diagram illustrating an example of configuration of a constant voltage device of the present exemplary embodiment. As illustrated in FIG. 1, a constant voltage device 10 of the present exemplary embodiment is mounted on a microcontroller (semiconductor integrated circuit) 1 together with a logic circuit 16, a capacitor connection terminal 18, and a capacitor element C1. Namely, the constant voltage device 10, the logic circuit 16, the capacitor connection terminal 18 and the capacitor element C1 are mounted on the same semiconductor chip.

The output of the constant voltage device 10 (of a voltage follower amplifier 30) of the present exemplary embodiment is connected to the logic circuit 16, and the constant voltage device 10 functions to supply a predetermined voltage (output voltage VDDL) to the logic circuit 16 through a node VDDL. The power source voltage of the microcontroller 1 of the present exemplary embodiment is, for example, 5V. However, transistors employed in the logic circuit 16 cannot be directly applied with a voltage of 5V due to a decrease in tolerable voltage accompanying miniaturization. The power source voltage is accordingly supplied to the logic circuit 16 by the constant voltage device 10 after being reduced to a voltage that is the tolerable voltage of the transistor employed in the logic circuit 16 or lower (for example, 2V).

The output of the constant voltage device 10 (of a voltage follower amplifier 30) of the present exemplary embodiment is moreover connected to the capacitor element C1. One terminal of the capacitor element C1, that is a decoupling capacitor, is connected to the output of the constant voltage device 10, and the other terminal of the capacitor element C1 is connected to ground. Moreover, the output of the constant voltage device 10 (of the voltage follower amplifier 30) of the present exemplary embodiment is connected to a capacitor element C2 through the capacitor connection terminal 18 if necessary (if desired by a user). The capacitor element C2, that is a decoupling capacitor, is a capacitor element provided externally to the microcontroller 1. In the microcontroller 1 of the present exemplary embodiment, the capacitor element C2 has a larger capacity than the capacitor element C1. As a predetermined example, in the present exemplary embodiment, the capacity of the capacitor element C1 is 1 nF, and the capacity of the capacitor element C2 is 1 μF.

The constant voltage device 10 of the present exemplary embodiment includes a reference voltage generation circuit 12, a constant current switch signal generation circuit 14, a constant current generation circuit 20, and the voltage follower amplifier 30.

The constant current generation circuit 20, that is a current mirror circuit, functions to supply a generated constant current to the voltage follower amplifier 30 through a node BL. The constant current generation circuit 20 of the present exemplary embodiment includes a PMOS (PMOS transistor, referred to below as PMOS) 22, a PMOS 24, an NMOS (NMOS transistor, referred to below as NMOS) 26, an NMOS 28, an NMOS 29, a resistor element R1, and a resistor element R2.

The drain of the PMOS 22 is connected to the drain of the NMOS 26. The drain of the PMOS 24 is connected to the drain of the NMOS 28. The source of the PMOS 22 and the source of the PMOS 24 are respectively connected to a power source voltage section at a potential VDD. Note that in the following explanation, the power source voltage section at the potential VDD is referred to as the "power source voltage VDD". The gate of the PMOS 22 and the gate of the PMOS 24 are each connected to both the drain of the PMOS 22 and the drain of the NMOS 26.

The gate of the NMOS 26 and gate of the NMOS 28 are connected to the drain of the PMOS 24 and the drain of the NMOS 28. The source of the NMOS 28 is connected to a site at a predetermined potential. Note that in the present exemplary embodiment, the source of the NMOS 28 is, for example, connected to ground. Namely, in the following explanation, a connection to a site at the predetermined potential refers to a connection to "ground". Moreover, the gate of the NMOS 28 is connected to the node BL. The source of the NMOS 26 is connected to one terminal of the resistor element R1.

The one terminal of the resistor element R1 is connected to the source of the NMOS 26, and the other terminal of the resistor element R1 is connected to one terminal of the resistor element R2. The one terminal of the resistor element R2 is connected to the other terminal of the resistor element R1, and the other terminal of the resistor element R2 is connected to ground.

The drain of the NMOS 29 is connected between the resistor element R1 and the resistor element R2. The source of the NMOS 29 is connected to ground. The gate of the NMOS 29 is connected to the constant current switch signal generation circuit 14.

The constant current switch signal generation circuit 14 includes memory 15. Specific examples of the memory 15 include, for example, flash memory, or a fuse. However, the memory 15 is not particularly limited, as long as it is a non-volatile storage device. The memory 15 is stored with a flag indicating a connection state of the capacitor element C2 (whether or not the capacitor element C2 is connected to the capacitor connection terminal 18). Note that in the present exemplary embodiment, the flag is stored in advance in the memory 15 by, for example, an external device (Central Processing Unit: CPU). The constant current switch signal generation circuit 14 functions to control the NMOS 29 ON/OFF by supplying a signal at a level corresponding to the flag through a node SEL to the gate of the NMOS 29 (described in detail later).

The voltage follower amplifier 30 employs a current supplied from the constant current generation circuit 20, and functions to supply the logic circuit 16 with a voltage at a lower potential than the power source voltage VDD, by generating and outputting a predetermined voltage VDDL from the output (reference voltage VREF) of the reference voltage generation circuit 12. Note that in the present exemplary embodiment, the potential of the reference voltage VREF (for example, VR) is the same as the potential of the predetermined voltage VDDL.

The voltage follower amplifier 30 includes a PMOS 32, and PMOS 34, an NMOS 36, an NMOS 38, and an NMOS 40 that function as a differential stage, and includes a PMOS 42 and an NMOS 44 that function as an output stage.

The gate of the NMOS 40 is connected to the constant current generation circuit 20 through the node BL. Moreover, the drain of the NMOS 40 is connected to the source of the NMOS 36 and the source of the NMOS 38.

The gate of the PMOS 32 and the gate of the PMOS 34, that configure a current mirror circuit, are connected to the drain of the PMOS 34 and the drain of the NMOS 38. The source of the PMOS 32 and the source of the PMOS 34 are connected to the power source voltage VDD. Moreover, the drain of the PMOS 32 is connected to the drain of the NMOS 36 and the gate of the PMOS 42. The drain of the PMOS 34 is connected to the drain of the NMOS 38.

The source of the NMOS 36 and the source of the NMOS 38, that configure a differential pair circuit, are connected to the drain of the NMOS 40. The gate of the NMOS 36 is connected to the reference voltage generation circuit 12. The reference voltage generation circuit 12 functions to generate and supply the reference voltage VREF (VR potential) to the voltage follower amplifier 30 (to the gate of the NMOS 36). The gate of the NMOS 38 is connected to the drain of the PMOS 42 and the drain of the NMOS 44 through the node VDDL.

The gate of the PMOS 42 is connected to the drain of the PMOS 32 and the drain of the NMOS 36. The source of the PMOS 42 is connected to the power source voltage VDD. Moreover, the drain of the PMOS 42 is connected to the drain of the NMOS 44.

The gate of the NMOS 44 is connected to the node BL. The source of the NMOS 44 is connected to ground. The potential between the PMOS 42 and the NMOS 44 is output as an output VDDL of the voltage follower amplifier 30.

Explanation follows regarding operation of the constant voltage device 10 of the present exemplary embodiment.

Figure 2:
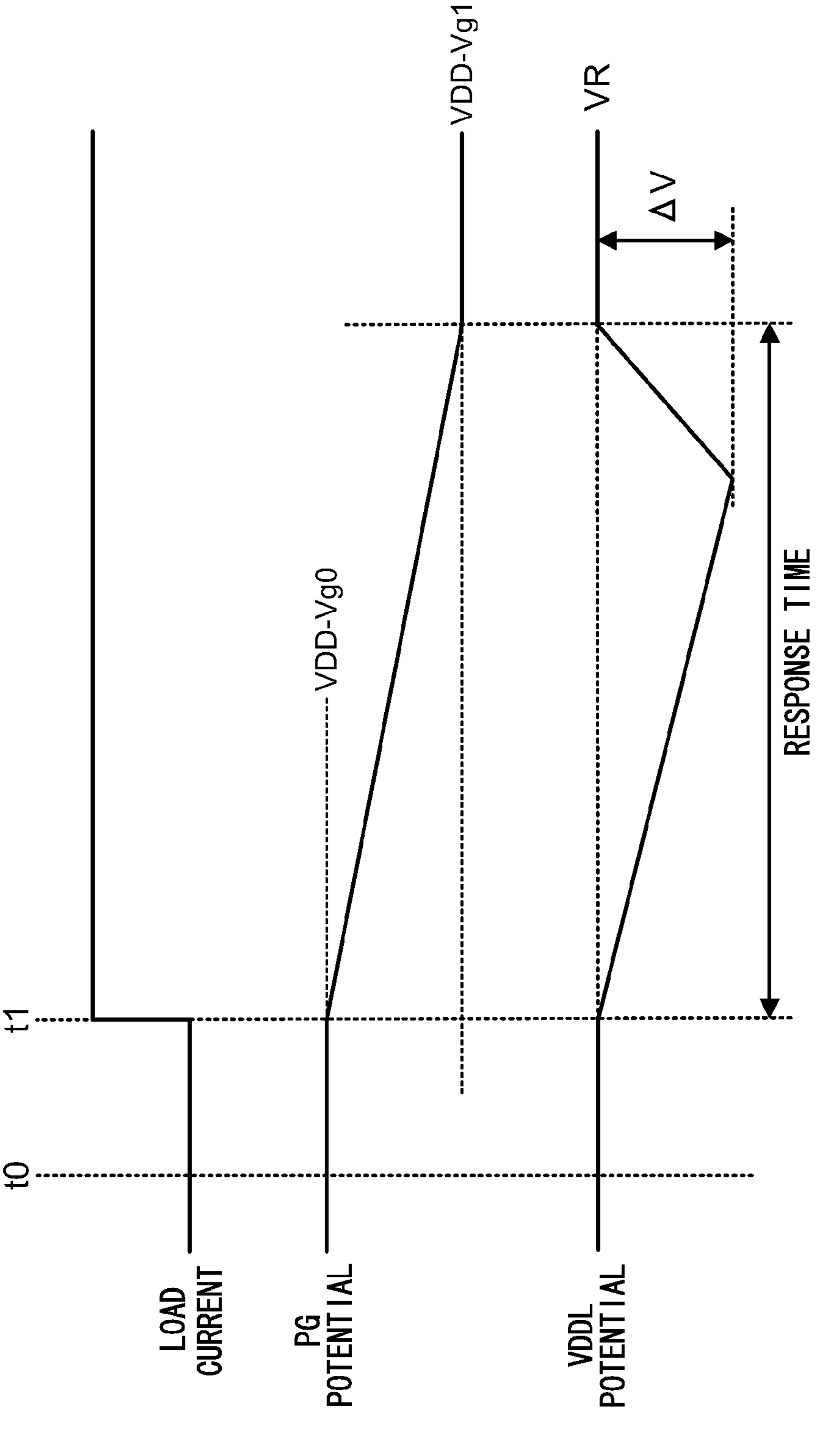
FIG. 2 is a time chart showing load current, PG potential, and VDDL potential in a case in which a capacitor element C2 is not connected to a microcontroller of the first exemplary embodiment.
Figure 3:
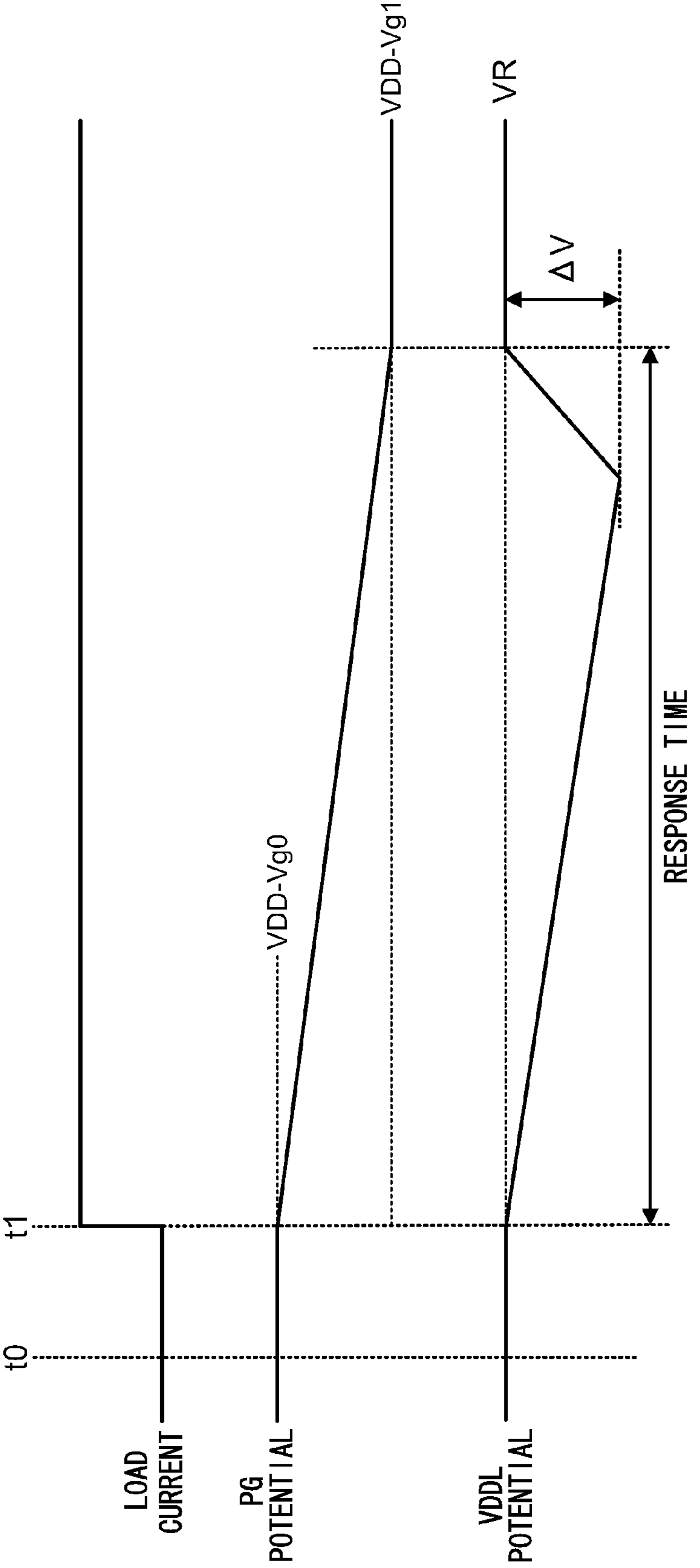
FIG. 3 is a time chart showing load current, PG potential, and VDDL potential in a case in which a capacitor element C2 is connected to a microcontroller of the first exemplary embodiment.

FIG. 2 is a time chart showing load current, the PMOS 42 gate potential (PG potential), and potential of the output VDDL (VDDL potential) in a case in which the capacitor element C2 is not connected to the microcontroller 1. FIG. 3 is a time chart of load current, the PMOS 42 gate potential (PG potential), and potential of the output VDDL (VDDL potential) in a case in which the capacitor element C2 is connected to the microcontroller 1.

The reference voltage VREF, that is the output of the reference voltage generation circuit 12, is input to the voltage follower amplifier 30. The voltage follower amplifier 30 operates such that potential of the output VDDL of the voltage follower amplifier 30 is at the same potential (for example, VR) as the reference voltage VREF.

At timings from t0 to t1 in FIG. 2 and FIG. 3, the logic circuit 16 is not operational, and the load current is minute. In the present exemplary embodiment, as a specific example, the load current when the logic circuit 16 is not operational is 0.1 μA.

Since the load current is minute, at 0.1 μA, the PMOS 42 is very close to an OFF state. In other words, the PMOS 42 has a high resistance state when ON (referred to below as the ON resistance), and the PMOS 42 gate potential (PG potential) is a potential corresponding to the load current of 0.1 μA, for example VDD-Vg0.

When operation of the logic circuit 16 starts, the current amount of the load current increases, as shown at the timing t1 in FIG. 2 and FIG. 3. In the present exemplary embodiment, as a specific example, the load current when the logic circuit 16 is operating is 1 mA. When the load current increases, the potential at the node VDDL decreases. Since the gate potential of the NMOS 38 decreases, the current of the NMOS 38 decreases, and the drain potential of the NMOS 38 increases, such that the currents of the PMOS 34 and the current of the PMOS 32, that shares a common gate potential with the PMOS 34, decrease. The drain potential of the PMOS 32 accordingly decreases, and the current of the PMOS 42, whose gate is connected to the drain of the PMOS 32, increases, supplying a current corresponding to the load current, in an attempt to maintain the potential of the node VDDL at the same potential as the reference voltage VREF.

The voltage follower amplifier 30 thereby operates to raise the current supply capability of the PMOS 42 by reducing the gate potential of the PMOS 42 (PG potential). The potential at the node VDDL (output voltage VDDL) accordingly becomes the desired potential (VR).

However, a certain amount of time is required for the response time of the voltage follower amplifier 30. A state in which the current supply capability of the PMOS 42 supplies a current that is smaller than the load current therefore persists until the voltage follower amplifier 30 responds.

A relationship between voltage drop ΔV of the node VDDL potential, load current I, load current continuation time T, and total capacity C of the decoupling capacitors (capacitor element C1 and capacitor element C2) connected to the node VDDL is expressed by the following Formula (1). Note that Formula (1) is satisfied in cases in which the supply current of the PMOS 42 is negligible compared to the load current I. Moreover, in the present exemplary embodiment, the response time T of the voltage follower amplifier 30 is taken as the load current continuation time T.

$$\Delta V = I \times (T/C) \quad \text{Formula (1)}$$

Figure 9:
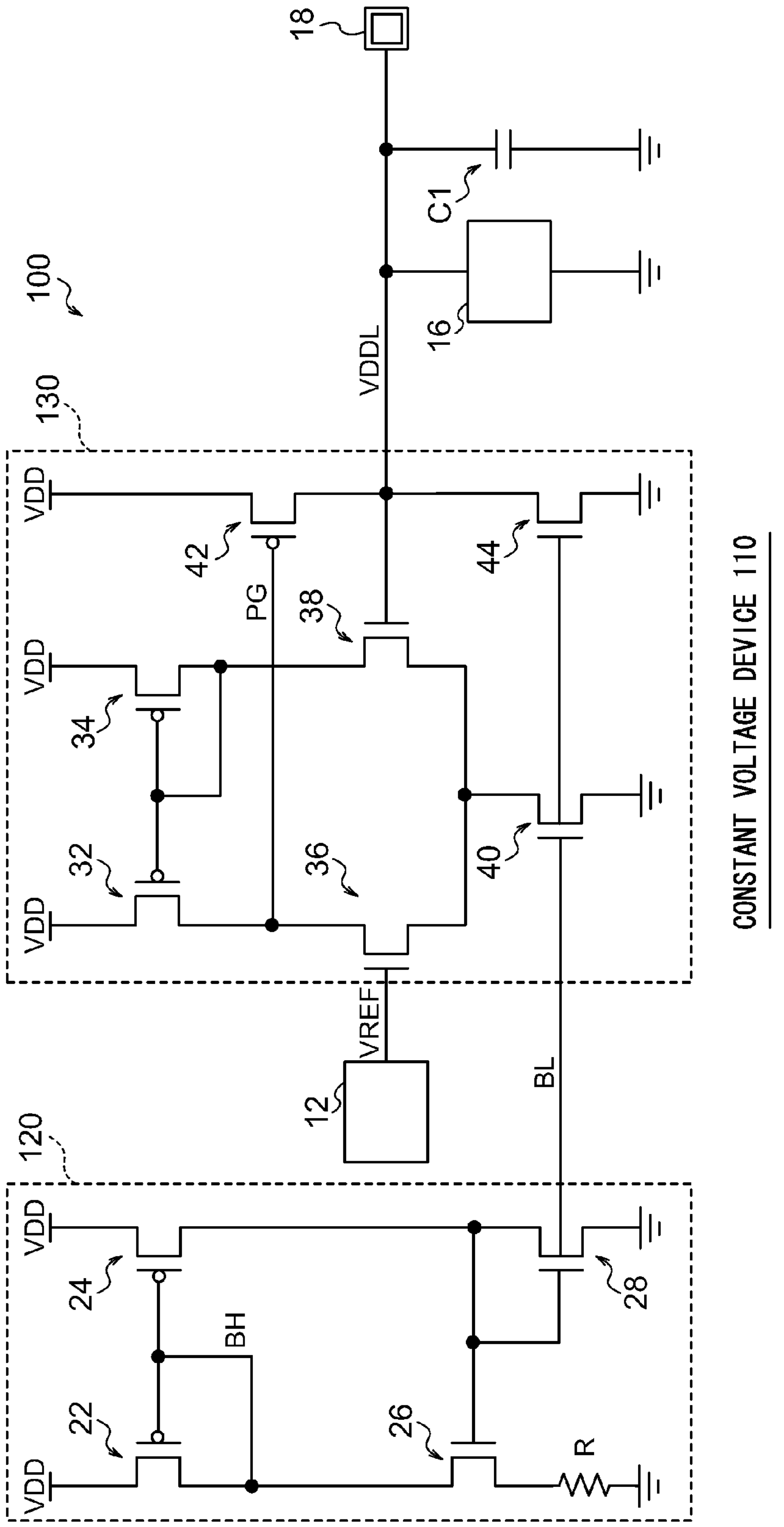
FIG.9 RELATED ART
FIG. 9 is a circuit diagram illustrating an example of configuration of a conventional constant voltage device of a Comparative Example.
Figure 10:
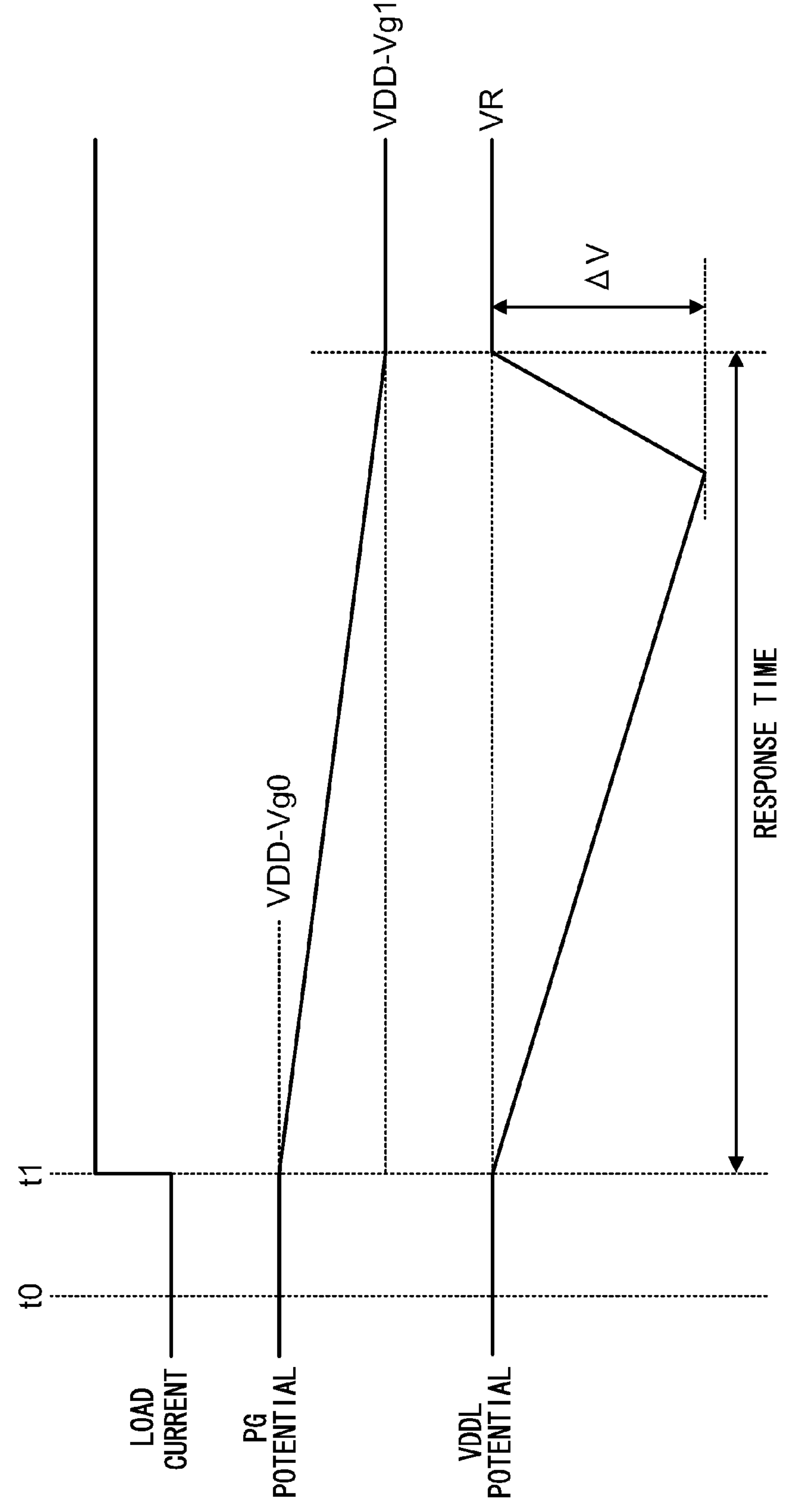
FIG.10 RELATED ART
FIG. 10 is a time chart showing load current, PG potential, and VDDL potential in a case in which a capacitor element C2 is not connected to a microcontroller of the Comparative Example illustrated in FIG. 9.

Explanation now follows regarding a Comparative Example of a conventional microcontroller including a constant voltage device. FIG. 9 is a circuit diagram of an example of a conventional microcontroller 100 including a constant voltage device 110. FIG. 10 is a time chart showing load current, gate potential of a PMOS 42 (PG potential), and output VDDL potential (VDDL potential) for the conventional microcontroller 100 illustrated in FIG. 9.

In the conventional constant voltage device 110, only a resistor element R (resistance value R) is attached to the source of an NMOS 26 of a constant current generation circuit 120. In the conventional constant voltage device 110, in cases in which a capacitor element C2 is not connected to a capacitor connection terminal 18, the capacity of a capacitor element C1=1 nF, load current I=1 mA, response time T=2 μs, and voltage drop ΔV is 1 mA×(2 μs/1 nF)=2V, according to Formula (1). For example, in cases in which the original VR potential of the output voltage VDDL of the constant voltage device 110 is 2V, the potential becomes 0V in the 2 μs period due to the voltage drop ΔV. In such cases there is an issue of the logic circuit 16 being unable to operate correctly.

By contrast, in the constant voltage device 10 of the present exemplary embodiment, the source of the NMOS 26 of the constant current generation circuit 120 is connected to the resistor element R1 and the resistor element R2. Note that the resistance value R1 of the resistor element R1 and the resistance value R2 of the resistor element R2 are, for example, set such that resistance value R1+resistance value R2=resistance value R. Moreover, the constant voltage device 10 of the present exemplary embodiment includes the NMOS 29, the constant current switch signal generation circuit 14, and the memory 15. As described above, the memory 15 is stored in advance with the flag indicating whether or not the capacitor element C2 is connected to the capacitor connection terminal 18. In the constant voltage device 10 of the present exemplary embodiment, as a specific example, a flag of "1" is stored when the capacitor element C2 is not connected to the capacitor connection terminal 18, and a flag of "0" is stored when the capacitor element C2 is connected to the capacitor connection terminal 18. The constant current switch signal generation circuit 14 controls the NMOS 29 ON and OFF by applying the gate of the NMOS 29 with a signal SEL at a level that is based on the flag.

When the capacitor element C2 is not connected to the capacitor connection terminal 18 of the microcontroller 1 of the present exemplary embodiment, the gate of the NMOS 29 is applied with an H level signal SEL corresponding to the flag of "1" stored in the memory 15. The signal SEL places the NMOS 29 in an ON state. The current that has flowed through the NMOS 26 flows through the NMOS 29 instead of the resistor element R2. The resistance value of the constant current generation circuit 20 becomes smaller as a result.

Since the current amount supplied to the voltage follower amplifier 30 from the constant current generation circuit 20 increases corresponding to the decrease in the resistance value, the drive current of the voltage follower amplifier 30 increases. The response time T of the voltage follower amplifier 30 is dependent on the current amount of the drive current, and so the response time becomes shorter accompanying the increase in drive current. In the constant voltage device 10 of the present exemplary embodiment, the resistance value R1 of the constant current generation circuit 20 is smaller than the resistance value R of the conventional constant current generation circuit 120, and so the response time T is shortened in comparison to the conventional constant current generation circuit 120. As seen from Formula (1), a reduction in the response time T reduces the voltage drop ΔV. The constant voltage device 10 of the present exemplary embodiment accordingly enables a decrease in the potential of the node VDDL to be suppressed.

The constant voltage device 10 of the present exemplary embodiment accordingly enables the voltage drop ΔV to be suppressed by increasing the current amount of the voltage follower amplifier 30 drive current. However, on the other hand, current consumption is increased. The capacitor element C2 is accordingly connected to the capacitor connection terminal 18 of the microcontroller 1 when employing the constant voltage device 10 for purposes that make an increase in current consumption undesirable.

When the capacitor element C2 is connected to the capacitor connection terminal 18 of the microcontroller 1 of the present exemplary embodiment, the gate of the NMOS 29 is applied with an L level signal SEL corresponding to the flag of "0" stored in the memory 15. The signal SEL places the NMOS 29 in an OFF state. The current that has flowed through the NMOS 26 flows through the resistor element R1 and the resistor element R2, and the resistance value of the constant current generation circuit 20 becomes a combined resistance value of the resistor element R1 and the resistor element R2 (resistance value R1+resistance value R2).

Since the resistance value of the constant current generation circuit 20 is greater than when the capacitor element C2 is not connected to the capacitor connection terminal 18, the current amount supplied to the voltage follower amplifier 30 is small. Since the drive current of the voltage follower amplifier 30 is small, the response time T of the voltage follower amplifier 30 becomes longer than when the capacitor element C2 is not connected to the capacitor connection terminal 18. However, the voltage drop ΔV is small since current is supplied from the capacitor element C2 until the voltage follower amplifier 30 responds.

Note that in reality, the combined capacitances of the capacitor element C1 and the capacitor element C2 are connected to the node VDDL, since the node VDDL is in a connected state to the capacitor element C1 and the capacitor element C2. However, the capacity=1 μF of the capacitor element C2 is extremely large compared to the capacity=1 nF of the capacitor element C1, and so the capacity of the capacitor element C1 may be effectively ignored.

Setting the load current I=1 mA, and the response time T=10 μs gives a voltage drop ΔV of 1 mA×(10 μs/1 μF)=10 mV according to Formula (1). This voltage drop ΔV is a value that is negligible in comparison to the original VR potential (for example, 2V) of the output voltage VDDL of the constant voltage device 110. Accordingly, in the constant voltage device 10 of the present exemplary embodiment, connecting the capacitor element C2 to the capacitor connection terminal 18 enables the voltage drop ΔV to be suppressed, and also enables current consumption to be suppressed.

As described above, the constant voltage device 10 of the present exemplary embodiment includes the constant current switch signal generation circuit 14 and the memory 15, and the constant current generation circuit 20 includes the resistor element R1, the resistor element R2, and the NMOS 29. When the capacitor element C2 is connected to the capacitor connection terminal 18, the NMOS 29 is placed in an OFF state by the constant current switch signal generation circuit 14. When the capacitor element C2 is not connected to the capacitor connection terminal 18, the NMOS 29 is placed in an ON state by the constant current switch signal generation circuit 14, thereby making the resistance value of the constant current generation circuit 20 smaller, and increasing the current amount of the voltage follower amplifier 30 drive current. The constant voltage device 10 of the present exemplary embodiment accordingly enables the voltage drop ΔV to be suppressed regardless of the capacitor element C2 connection state.

The constant voltage device 10 of the present exemplary embodiment enables the current amount of the voltage follower amplifier 30 drive current to be regulated according to the capacitor element C2 connection state. Accordingly, a single type of constant voltage device 10 (microcontroller 1) accommodates both usage for which current consumption is not a consideration and the capacitor element C2 is not connected, and usage in which the capacitor element C2 is connected to reduce current consumption.

Note that in the present exemplary embodiment, explanation has been given regarding a case in which the flag indicating the connection state of the capacitor element C2 is stored in advance in the memory 15 of the logic circuit 16. However, the present exemplary embodiment is not limited thereto. For example, configuration may be made such that the capacitor element C2 connection state is detected or determined by a device external to the microcontroller 1, and the capacitor element C2 connection state stored in the memory 15.

Second Exemplary Embodiment

A constant voltage device of the present exemplary embodiment includes similar configuration and operation to the constant voltage device 10 of the first exemplary embodiment, with such similar configuration and operation indicated as such, and detailed explanation thereof omitted.

Figure 4:
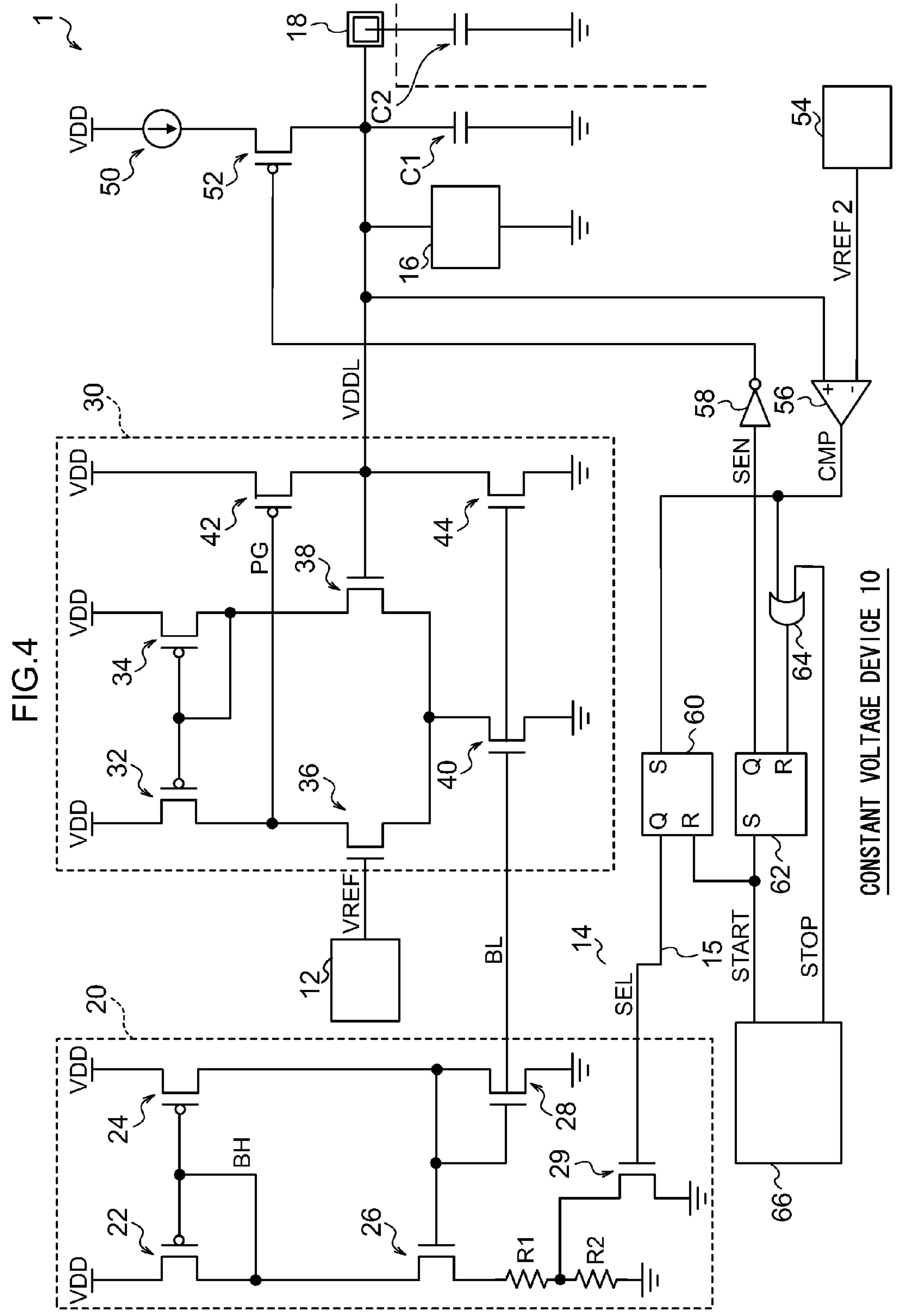
FIG. 4 is a circuit diagram illustrating an example of configuration of a constant voltage device of a second exemplary embodiment.

FIG. 4 is a circuit diagram illustrating an example of configuration of a constant voltage device of the present exemplary embodiment. As illustrated in FIG. 4, a constant voltage device 10 of the present exemplary embodiment differs in the configuration for controlling the current amount of the constant current generation circuit 20 drive current. More specifically, in the constant voltage device 10 of the present exemplary embodiment, configuration to detect whether or not the capacitor element C2 is connected, and to control the NMOS 29 of the constant current generation circuit 20 ON and OFF, differs from the constant voltage device 10 of the first exemplary embodiment.

The constant voltage device 10 of the present exemplary embodiment includes a reference voltage generation circuit 12, a constant current generation circuit 20, and a voltage follower amplifier 30, similarly to the constant voltage device 10 of the first exemplary embodiment. The constant voltage device 10 of the present exemplary embodiment moreover includes a constant voltage circuit 50, a PMOS 52, a reference voltage generation circuit 54, a comparison circuit 56, an inverter 58, an RS latch 60, an RS latch 62, an OR circuit 64, and a control circuit 66.

The constant voltage circuit 50 is connected to the power source voltage VDD and the source of the PMOS 52, and functions to supply a constant current to the PMOS 52. The source of the PMOS 52 is connected to the constant voltage circuit 50, the drain of the PMOS 52 is connected to the node VDDL, and the gate of the PMOS 52 is connected to the output of the inverter 58.

The non-inverting input terminal of the comparison circuit 56 is connected to the node VDDL. The reference voltage generation circuit 54 is connected to the inverting input terminal of the comparison circuit 56.

The reference voltage generation circuit 54 is capable of generating and supplying a reference voltage VREF2 to the comparison circuit 56. Note that in the present exemplary embodiment, a VR potential 2 of the reference voltage VREF2 generated by the reference voltage generation circuit 54 is higher than the VR potential of the reference voltage VREF.

The output of the comparison circuit 56 is connected to the set terminal S of the RS latch 60, and to an input of the OR circuit 64. The OR circuit 64 outputs to the reset terminal of the RS latch 62 a signal at a level corresponding to the logical sum of the output of the comparison circuit 56, and a signal STOP that is input from the control circuit 66. The set terminal of the RS latch 62 is connected to the control circuit 66. The control circuit 66 functions to output an H pulse signal START and signal STOP at predetermined timings (detailed explanation follows later).

The reset terminal of the RS latch 60 is connected to the control circuit 66, the set terminal of the RS latch 60 is connected to the output of the comparison circuit 56, and the output terminal of the RS latch 60 is connected to the gate of the NMOS 29 of the constant current generation circuit 20.

Explanation follows regarding operation of the constant voltage device 10 of the present exemplary embodiment.

The reference voltage VREF, that is the output of the reference voltage generation circuit 12, is input to the voltage follower amplifier 30. The voltage follower amplifier 30 operates such that the potential of the output VDDL of the voltage follower amplifier 30 becomes the same potential as the reference voltage VREF (for example, VR).

Figure 5:
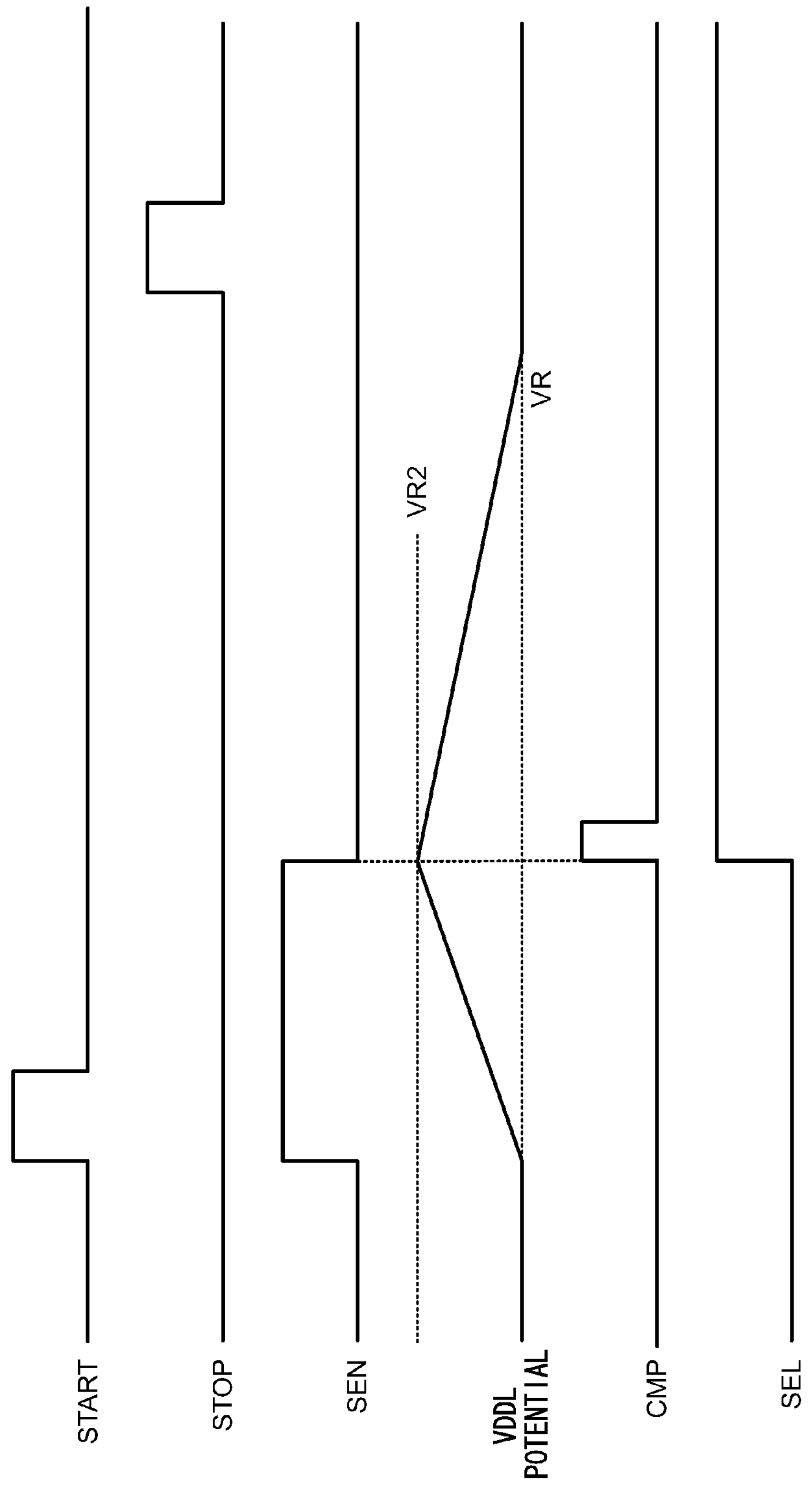
FIG. 5 is a time chart showing variation of VDDL potential in a case in which a capacitor element C2 is not connected to a microcontroller of the second exemplary embodiment.

FIG. 5 is a time chart showing variation of potential of the output VDDL (VDDL potential) in a case in which the capacitor element C2 is not connected to the microcontroller 1.

The control circuit 66 outputs the H pulse signal START. The H pulse signal START resets the RS latch 60, and sets the RS latch 62. A signal SEN output from the RS latch 62 to the inverter 58 becomes H level. An L level signal is accordingly applied to the gate of the PMOS 52, thereby placing the PMOS 52 in an ON state. When the PMOS 52 is placed in the ON state, current is supplied from the constant voltage circuit 50 to the node VDDL. When the capacitor element C2 is not connected to the microcontroller 1 (capacitor connection terminal 18), the supplied current flows in the capacitor element C1 only. Since the capacitor element C1 has a small capacity, the potential of the node VDDL (VDDL potential) rises in a short space of time in comparison to when the capacitor element C2 is connected. Namely, the VDDL potential rises rapidly when the capacitor element C2 is not connected (a large change amount per unit time).

In the present exemplary embodiment, the potential VR2 of the reference voltage VREF2 is set higher than the VR potential of the reference voltage VREF (VR2>VR). An output signal CMP of the comparison circuit 56 accordingly becomes H level when the VDDL potential exceeds the VR2 potential. The H level signal CMP sets the RS latch 60. An H level signal is accordingly applied from the RS latch 60 to the gate of the NMOS 29 of the constant current generation circuit 20.

Due to the H level output signal CMP, the OR circuit 64 outputs an H level signal to the reset terminal of the RS latch 62, thereby resetting the RS latch 62. Since the signal START is L level, the level of the signal SEN output from the RS latch 62 becomes L level. The gate of the PMOS 52 is therefore applied with an H level signal, thus placing the PMOS 52 in the OFF state. Current supply from the constant voltage circuit 50 to the node VDDL stops when the PMOS 52 is placed in the OFF state.

Moreover, in the constant current generation circuit 20, the signal SEL applied to the gate of the NMOS 29 is H level, placing the NMOS 29 in the ON state, and the current that has flowed through the NMOS 26 flows through the NMOS 29 instead of the resistor element R2. The resistance value of the constant current generation circuit 20 becomes smaller as a result. Similarly to in the constant voltage device 10 of the first exemplary embodiment, the current amount supplied to the voltage follower amplifier 30 from the constant current generation circuit 20 increases corresponding to the decrease in the resistance value, and so the voltage follower amplifier 30 drive current increases. Accordingly, the constant voltage device 10 of the present exemplary embodiment also enables the response time T of the voltage follower amplifier 30 to be shortened, and enables a decrease in the potential of the node VDDL to be suppressed.

Figure 6:
FIG. 6 is a time chart showing variation of VDDL potential in a case in which a capacitor element C2 is connected to a microcontroller of the second exemplary embodiment.

FIG. 6 is a time chart showing variation of potential of the output VDDL (VDDL potential) in a case in which the capacitor element C2 is connected to the microcontroller 1.

The H pulse signal START is output from the control circuit 66. The H pulse signal START resets the RS latch 60, and sets the RS latch 62. The signal SEN output from the RS latch 62 to the inverter 58 becomes H level. An L level signal is therefore applied to the gate of the PMOS 52, thus placing the PMOS 52 in the ON state. When the PMOS 52 is placed in the ON state, current is supplied from the constant voltage circuit 50 to the node VDDL. When the capacitor element C2 is connected to the microcontroller 1 (to capacitor connection terminal 18), the supplied current flows in the capacitor element C1 and the capacitor element C2. Since the capacitor element C2 has a higher capacity than the capacitor element C1, as described above, the potential of the node VDDL (VDDL potential) rises over a longer period of time than when the capacitor element C2 is not connected. Namely, the VDDL potential rises gently when the capacitor element C2 is connected (a small change amount per unit time).

In the present exemplary embodiment, since the potential VR2 of the reference voltage VREF2 is set higher than the VR potential of the reference voltage VREF (VR2>VR), the VDDL potential does not exceed the VR2 potential, or it takes a long time for the VDDL potential to exceed the VR2 potential. The output signal CMP of the comparison circuit 56 accordingly remains at the L level. The RS latch 60 is not set, since the signal CMP remains at the L level. The signal SEL applied to the gate of the NMOS 29 of the constant current generation circuit 20 from the RS latch 60 also remains at the L level as a result.

The RS latch 62 is reset when the H pulse signal STOP is output from the control circuit 66. Since the signal START is L level, the level of the signal SEN output from the RS latch 62 becomes L level. Accordingly an H level signal is applied to the gate of the PMOS 52, placing the PMOS 52 in the OFF state. Current supply from the constant voltage circuit 50 to the node VDDL stops when the PMOS 52 is placed in the OFF state.

Moreover, in the constant current generation circuit 20, the signal SEL applied to the gate of the NMOS 29 remains at the L level, and so the NMOS 29 is in the OFF state. Current that has flowed through the NMOS 26 accordingly flows through the resistor element R1 and the resistor element R2, increasing the resistance value of the constant current generation circuit 20. Similarly to with the constant voltage device 10 of the first exemplary embodiment, since the current amount supplied from the constant current generation circuit 20 to the voltage follower amplifier 30 is small, the drive current of the voltage follower amplifier 30 is small. Accordingly, although the response time T of the voltage follower amplifier 30 is not shortened, the constant voltage device 10 of the present exemplary embodiment enables a decrease in the node VDDL potential to be suppressed since current can be supplied from the capacitor element C2 until the voltage follower amplifier 30 responds.

Note that in the present exemplary embodiment, the interval between the control circuit 66 outputting the H pulse signal START and outputting the H pulse signal STOP, as well as the VR2 potential of the reference voltage VREF2 generated by the reference voltage generation circuit 54, may be set in advance through testing or the like. For example, the interval between output of the H pulse signal START and output of the H pulse signal STOP may be set in advance through testing or the like, as long as it does not exceed the duration until the VDDL potential reaches the VR2 potential in the connected state of the capacitor element C2 to the capacitor connection terminal 18 (see FIG. 6).

The constant voltage device 10 of the present exemplary embodiment does not require the constant current switch signal generation circuit 14 or the memory 15 that are provided to the constant voltage device 10 of the first exemplary embodiment. There is accordingly no need for a flash memory, fuse, or the like. The constant voltage device 10 of the present exemplary embodiment may accordingly be applied to a microcontroller 1 (semiconductor chip) that is not provided with a flash memory, fuse, or the like.

Moreover, in the constant voltage device 10 of the present exemplary embodiment, current is supplied to the node VDDL from the constant voltage circuit 50. Depending on the change (rise) in the node VDDL potential, determination is made that the capacitor element C2 is not connected when the rise is rapid, and determination is made that the capacitor element C2 is connected when the rise is gentle. The constant voltage device 10 of the present exemplary embodiment thus enables automatic determination as to whether or not the capacitor element C2 is connected, dispensing with the need to store flags such as in the constant voltage device 10 of the first exemplary embodiment. The constant voltage device 10 of the present exemplary embodiment accordingly enables high degrees of freedom in usage (usage in which the capacitor element C2 is not connected and usage in which the capacitor element C2 is connected (suppressing current consumption)).

As described above, in the constant voltage device 10 of each of the exemplary embodiments, the NMOS 29 is in the ON state, and the constant current generation circuit 20 has a small resistance value, when the capacitor element C2 is not connected to the microcontroller 1 (to the capacitor connection terminal 18), thereby increasing the current amount of the current supplied from the constant current generation circuit 20 to the voltage follower amplifier 30. The drive current of the voltage follower amplifier 30 accordingly increases, shortening the response time T, and suppressing voltage drop of the node VDDL. Moreover, the NMOS 29 is in the OFF state, and the constant current generation circuit 20 has a large resistance value, when the capacitor element C2 is connected to the microcontroller 1 (to the capacitor connection terminal 18), thereby suppressing the current amount of the current supplied from the constant current generation circuit 20 to the voltage follower amplifier 30, and suppressing current consumption. In such cases, voltage drop of the node VDDL is suppressed due to supplying current to the node VDDL from the capacitor element C2.

The constant voltage device 10 of the present exemplary embodiment accordingly enables the current amount of the drive current of the constant current generation circuit 20 to be regulated according to the capacitor element C2 connection state.

Figure 7:
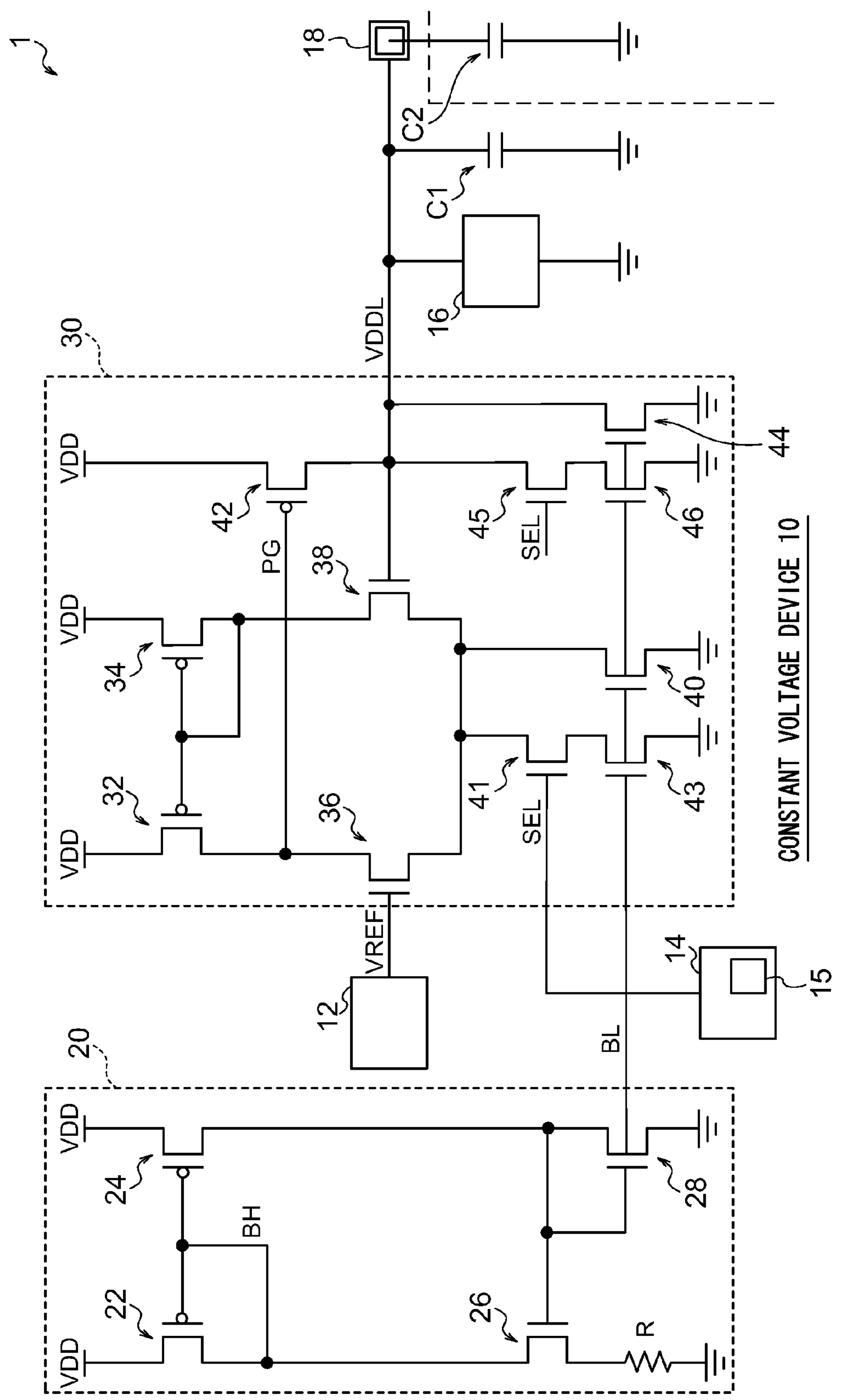
FIG. 7 is a circuit diagram illustrating another example of configuration of a constant voltage device.
Figure 8:
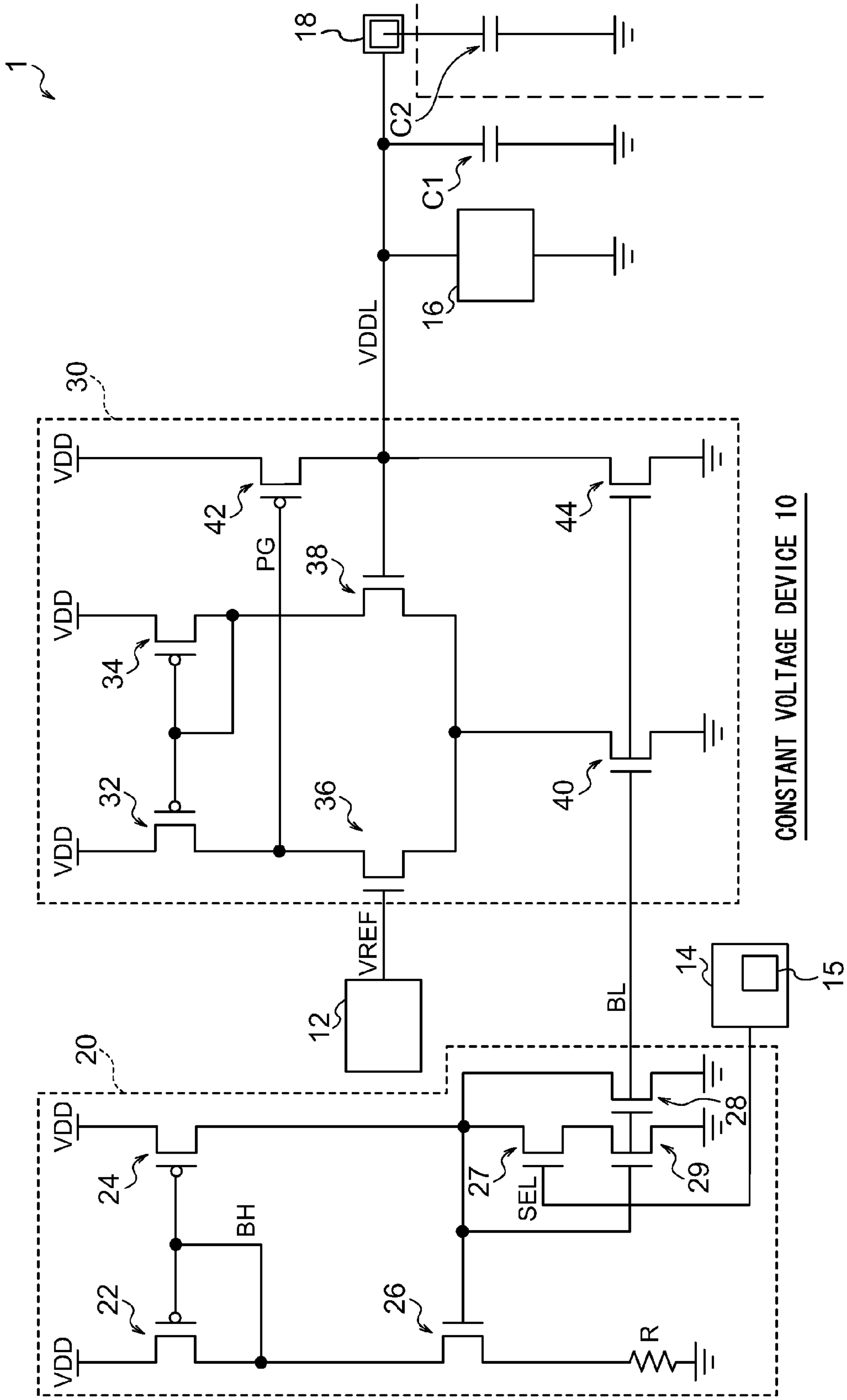
FIG. 8 is a circuit diagram illustrating another example of configuration of a constant voltage device.

Note that in each of the exemplary embodiments described above, explanation has been given regarding cases in which the resistance value of the constant current generation circuit 20 is changed, and the current amount of the current supplied from the constant current generation circuit 20 to the voltage follower amplifier 30 is controlled, in order to control the voltage follower amplifier 30 drive current. However, the configuration and operation by which the voltage follower amplifier 30 drive current is controlled is not limited thereto. For example, a constant current mirror ratio between the constant current generation circuit 20 and the voltage follower amplifier 30 may be varied. FIG. 7 is a circuit diagram illustrating an example of a configuration of a constant voltage device 10 in which the constant current mirror ratio between the constant current generation circuit 20 and the voltage follower amplifier 30 is varied according to whether or not the capacitor element C2 is connected to the capacitor connection terminal 18. FIG. 8 is a circuit diagram illustrating another example of a configuration of a constant voltage device 10, in which the constant current mirror ratio between the constant current generation circuit 20 and the voltage follower amplifier 30 is varied according to whether or not the capacitor element C2 is connected to the capacitor connection terminal 18.

The constant voltage devices 10 illustrated in FIG. 7 and FIG. 8 differ from the constant voltage device 10 in each of the exemplary embodiments described above, in that the constant current generation circuit 20 includes a resistor element R in place of the resistor element R1 and the resistor element R2, and moreover does not include the NMOS 29.

The constant voltage device 10 illustrated in FIG. 7 differs from the constant voltage device 10 in each of the exemplary embodiments described above in that the voltage follower amplifier 30 further includes an NMOS 41, an NMOS 43, an NMOS 45, and an NMOS 46. The source of the NMOS 41 is connected to the drain of the NMOS 43. The drain of the NMOS 41 is connected to the source of the NMOS 36 and the source of the NMOS 38. The source of the NMOS 45 is connected to the drain of the NMOS 46. The drain of the NMOS 45 is connected to the drain of the PMOS 42. The gate of the NMOS 41 and the gate of the NMOS 45 are connected to the constant current switch signal generation circuit 14.

The constant current switch signal generation circuit 14 controls the NMOS 41 and the NMOS 45 ON and OFF by applying the gate of the NMOS 41 and the gate of the NMOS 45 with a signal SEL at a level based on a flag stored in memory 15, similarly to in the constant voltage device 10 of the first exemplary embodiment.

Similarly to the constant voltage device 10 of each of the exemplary embodiments described above, in the constant voltage device 10 illustrated in FIG. 7 the NMOS 41 and the NMOS 45 are in an ON state when the capacitor element C2 is not connected, giving a large current. However, the NMOS 41 and the NMOS 45 are in an OFF state when the capacitor element C2 is connected. The constant current mirror ratio between the constant current generation circuit 20 and the voltage follower amplifier 30 is varied, enabling control of the current amount of the current supplied to the voltage follower amplifier 30.

The constant voltage device 10 illustrated in FIG. 8 differs from the constant voltage device 10 in each of the exemplary embodiments described above, in that the constant current generation circuit 20 further includes an NMOS 27 and an NMOS 29. The source of the NMOS 27 is connected to the drain of the NMOS 29. The drain of the NMOS 27 is connected to the drain of the PMOS 24, the gate of the NMOS 26, and the drain of the NMOS 28. The gate of the NMOS 27 is connected to the constant current switch signal generation circuit 14.

The constant current switch signal generation circuit 14 in FIG. 8 controls the NMOS 27 ON and OFF by applying the gate of the NMOS 27 with a signal SEL at a level based on a flag stored in memory 15, similarly to in the constant voltage device 10 of the first exemplary embodiment.

The constant voltage device 10 illustrated in FIG. 8 differs in that the NMOS 27 is placed in the OFF state when the capacitor element C2 is not connected, such that current flows only in the NMOS 28. However, the NMOS 27 is placed in the ON state when the capacitor element C2 is connected. The constant current mirror ratio between the constant current generation circuit 20 and the voltage follower amplifier 30 is thereby varied, enabling the current amount of the current supplied to the voltage follower amplifier 30 to be controlled.

Each of the exemplary embodiments described above is configured with the resistor element R1 and the resistor element R2 of the constant current generation circuit 20 connected in series. However, the resistors of the constant current generation circuit 20 are not limited thereto, and there is no particular limitation, as long as configuration is made so as to enable the resistance value to be varied. For example, plural resistor elements may be connected in parallel, or other variable resistors may be employed.

In each of the exemplary embodiments described above, the constant current generation circuit 20 is configured with two resistance value levels (the resistance value R1, and the resistance value R1+R2). However, levels for varying the resistance value of the constant current generation circuit 20 are not limited thereto, and configuration may be made with two or more levels (for example, 3 levels).

Other configurations and operations of the microcontroller 1, the constant voltage device 10, the constant current generation circuit 20, and the voltage follower amplifier 30 described with respect to each of the exemplary embodiments described above are merely examples thereof, and obviously various modifications may be implemented as required within a range not departing from the spirit of the present invention.

What is claimed is:

1. A semiconductor device comprising:

a current generation circuit that generates a current;

a voltage generation circuit that, using the current generated by the current generation circuit, generates and outputs a predetermined voltage from a reference voltage, with an internal capacitor element that is connected to an output of the voltage generation circuit, the internal capacitor element being provided within an integrated circuit on which the semiconductor device itself is mounted;

a storage section that stores a flag indicating a connection state between the output of the voltage generation circuit and an external capacitor element provided externally to the integrated circuit; and a controller that, based on the flag, controls a current amount of the current used by the voltage generation circuit to generate the predetermined voltage, wherein the current generation circuit comprises a first PMOS transistor, with a source connected to a power source voltage section, a second PMOS transistor, with a source connected to the power source voltage section, and with a gate connected to a gate of the first PMOS transistor;

a first NMOS transistor, with a drain connected to a drain and the gate of the first PMOS transistor, and with a gate connected to a drain of the second PMOS transistor, a second NMOS transistor, with a drain connected to the drain of the second PMOS transistor, with a source connected to a location at a predetermined potential, and with a gate connected to the gate of the first NMOS transistor, a first resistor element with one terminal connected to a source of the first NMOS transistor, a second resistor element with one terminal connected to another terminal of the first resistor element, and with another terminal connected to a location at the predetermined potential, and a third NMOS transistor with a drain connected to the other terminal of the first resistor element, a source connected to a location at the predetermined potential, and a gate connected to the controller, wherein the controller places the third NMOS transistor in an OFF state in a case in which the flag indicates a connection state of the output of the voltage generation circuit and the external capacitor element connected together, and places the third NMOS transistor in an ON state in a case in which the flag indicates a connection state of the output of the voltage generation circuit and the external capacitor element not connected together.

2. The semiconductor device of claim 1, wherein the controller:

controls to a first current amount in a case in which the connection state indicated by the flag indicates that the output of the voltage generation circuit and the external capacitor element are connected together; and controls to a second current amount, that is larger than the current amount of the first current amount, in a case in which the connection state indicated by the flag indicates that the output of the voltage generation circuit and the external capacitor element are not connected together.

3. The semiconductor device of claim 1, wherein the controller controls the current amount of the current generated by the current generation circuit based on the flag.

4. A semiconductor device comprising:

a current generation circuit that generates current;

a voltage generation circuit that, using the current generated by the current generation circuit, generates and outputs a predetermined voltage from a reference voltage, with an internal capacitor element that is connected to an output of the voltage generation circuit, the internal capacitor element being provided within an integrated circuit on which the semiconductor device itself is mounted; and a controller that determines a connection state between the output of the voltage generation circuit and an external capacitor element provided externally to the integrated circuit, and that controls a current amount of the current used by the voltage generation circuit to generate the predetermined voltage, based on the connection state, wherein the current generation circuit comprises a first PMOS transistor, with a source connected to a power source voltage section, a second PMOS transistor, with a source connected to the power source voltage section, and with a gate connected to a gate of the first PMOS transistor, a first NMOS transistor, with a drain connected to a drain and the gate of the first PMOS transistor, and with a gate connected to a drain of the second PMOS transistor, a second NMOS transistor, with a drain connected to the drain of the second PMOS transistor, with a source connected to a location at a predetermined potential, and with a gate connected to the gate of the first NMOS transistor, a first resistor element with one terminal connected to a source of the first NMOS transistor, a second resistor element with one terminal connected to another terminal of the first resistor element, and with another terminal connected to a location at the predetermined potential, and a third NMOS transistor with a drain connected to the other terminal of the first resistor element, a source connected to a location at the predetermined potential, and a gate connected to the controller, wherein the controller places the third NMOS transistor in an OFF state in a case in which a connection state of the output of the voltage generation circuit and the external capacitor element are connected together, and places the third NMOS transistor in an ON state in a case in which a connection state of the output of the voltage generation circuit and the external capacitor element are not connected together.

5. The semiconductor device of claim 4, wherein the controller determines the connection state based on a change amount per unit time of the output voltage output from the voltage generation circuit.

6. The semiconductor device of claim 4, wherein the controller includes:

a constant current circuit that supplies a predetermined current to the output of the voltage generation circuit;

a control reference voltage generation circuit that generates a control reference voltage with a higher voltage value than the reference voltage; and a comparison circuit that compares the control reference voltage and the output of the voltage generation circuit, wherein the controller controls the current amount of the current used by the voltage generation circuit to generate the predetermined voltage, based on a comparison result of the comparison circuit.

7. The semiconductor device of claim 6, wherein the controller includes:

a control circuit that outputs a start signal and a stop signal;

a first RS latch that is set by, and outputs, a signal at a level corresponding to the start signal, and that is reset according to a signal corresponding to a combination of the comparison result of the comparison circuit and the stop signal;

a switching element that controls to supply current from the constant current circuit to the output of the voltage generation circuit according to level of the output of the first RS latch;

a second RS latch that is set by, and outputs, a signal at a level according to the comparison result of the comparison circuit, and that is reset according to a signal at a level according to the start signal, wherein the controller controls the current amount based on the signal output from the second RS latch.

8. A current control method of a semiconductor device comprising:

a process of using a current generation circuit to generate a current;

a process of using a voltage generation circuit having an internal capacitor element that is connected to an output of the voltage generation circuit, the internal capacitor element being provided within an integrated circuit on which the semiconductor device itself is mounted, to generate, and output, a predetermined voltage from a reference voltage using the current generated by the current generation circuit; and a process of using a controller, based on a flag stored in a storage section indicating a connection state between the output of the voltage generation circuit and an external capacitor element provided externally to the integrated circuit, to control a current amount of the current used by the voltage generation circuit to generate the predetermined voltage, wherein the current generation circuit comprises a first PMOS transistor, with a source connected to a power source voltage section, a second PMOS transistor, with a source connected to the power source voltage section, and with a gate connected to a gate of the first PMOS transistor, a first NMOS transistor, with a drain connected to a drain and the gate of the first PMOS transistor, and with a gate connected to a drain of the second PMOS transistor, a second NMOS transistor, with a drain connected to the drain of the second PMOS transistor, with a source connected to a location at a predetermined potential, and with a gate connected to the gate of the first NMOS transistor, a first resistor element with one terminal connected to a source of the first NMOS transistor, a second resistor element with one terminal connected to another terminal of the first resistor element, and with another terminal connected to a location at the predetermined potential, and a third NMOS transistor with a drain connected to the other terminal of the first resistor element, a source connected to a location at the predetermined potential, and a gate connected to the controller, wherein the controller places the third NMOS transistor in an OFF state in a case in which the flag indicates a connection state of the output of the voltage generation circuit and the external capacitor element connected together, and places the third NMOS transistor in an ON state in a case in which the flag indicates a connection state of the output of the voltage generation circuit and the external capacitor element not connected together.

* * * * *